L. R. POSCHADEL.
DISH.
APPLICATION FILED MAR. 5, 1918.

1,272,996.

Patented July 16, 1918.
2 SHEETS—SHEET 1.

WITNESSES

INVENTOR
Leonard R. Poschadel
BY
ATTORNEYS

L. R. POSCHADEL.
DISH.
APPLICATION FILED MAR. 5, 1918.

1,272,996.

Patented July 16, 1918.
2 SHEETS—SHEET 2.

WITNESSES

INVENTOR
Leonard R. Poschadel
BY
ATTORNEYS

UNITED STATES PATENT OFFICE.

LEONARD R. POSCHADEL, OF NEW YORK, N. Y.

DISH.

1,272,996.　　　　　Specification of Letters Patent.　　Patented July 16, 1918.

Application filed March 5, 1918.　Serial No. 220,504.

*To all whom it may concern:*

Be it known that I, LEONARD R. POSCHADEL, a citizen of the United States, and a resident of the city of New York, borough of Manhattan, in the county and State of New York, have invented a new and Improved Dish, of which the following is a full, clear, and exact description.

This invention relates to dishes and has for an object the provision of an improved construction wherein all of the contents may be removed without tilting the dish.

Another object in view is the provision in a dish or receptacle of a recessed or depressed portion whereby the contents may be easily dipped therefrom without molesting the position of the dish or receptacle.

Figure 1:
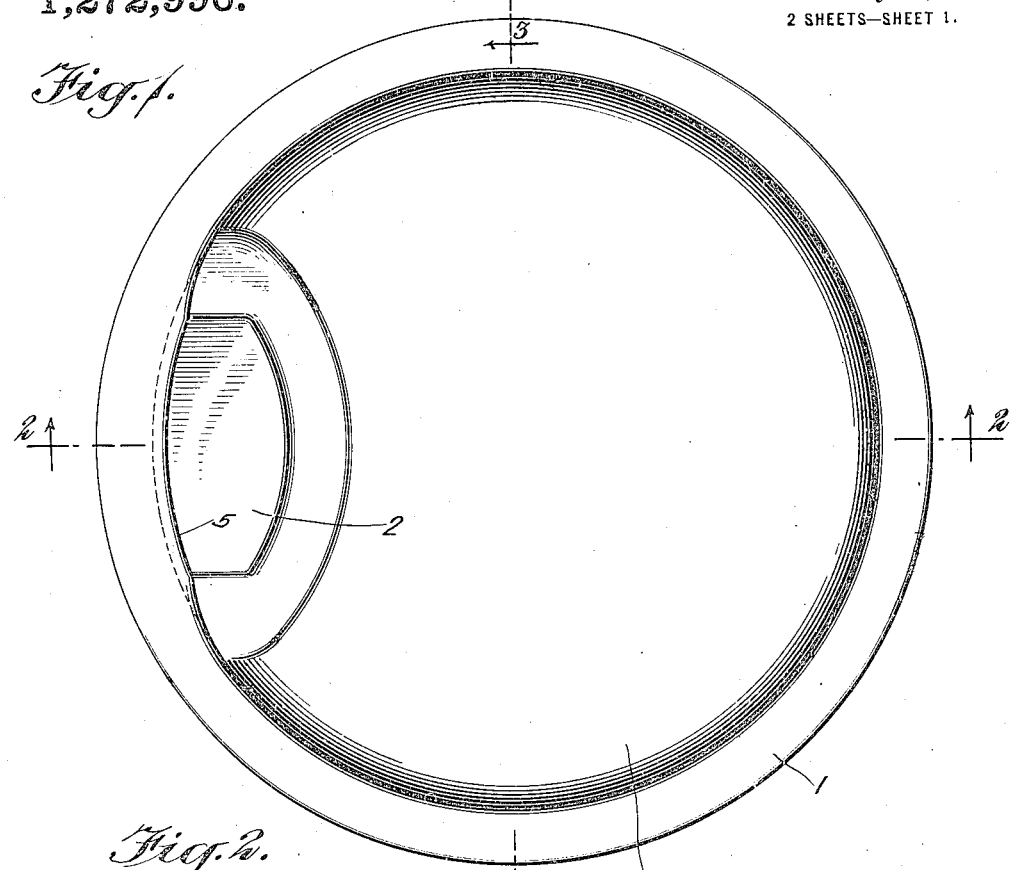
Figure 1 is a top plan view of a soup dish disclosing an embodiment of the invention.

Referring to the accompanying drawings by numerals, 1 indicates a soup dish of substantially any desired kind, said dish being provided with a depressed portion 2 merging into a side wall 3 of the dish and also a bottom 4. The side wall 3 is provided with a ridge or overhanging projection 5 above the depression 2 whereby when any one is eating soup or any other food from the dish 1 the same may be easily taken up by a soup spoon even though there is only a small quantity therein, as said small quantity may be forced into the depression 2 and taken into a spoon. In the case of berries or other articles the overhanging shoulder or stop 5 assists in causing the berries or other article to enter the spoon. The depression 2 and the shoulder 5 permits a person to remove soup or other food from the dish by the use of a spoon without tilting the dish.

Figure 2:
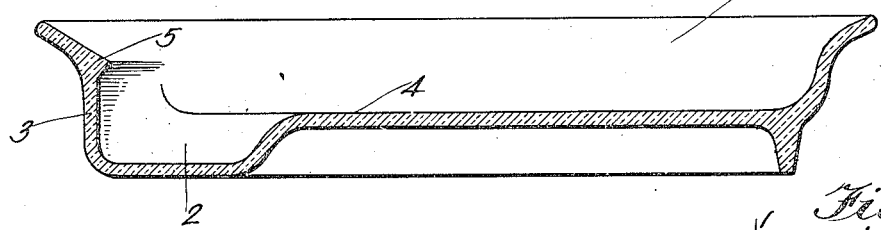
Fig. 2 is a transverse sectional view through Fig. 1 on line 2—2.
Figure 3:
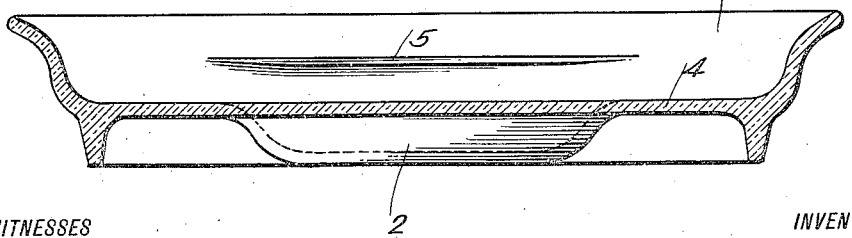
Fig. 3 is a transverse sectional view through Fig. 1 on line 3—3.

In the Figs. 1 to 3 the invention is shown applied to a soup dish, but it will be understood, of course, that the invention may be applied to dishes of any desired kind, as for instance, punch bowls, berry bowls, or in fact any desired kind from which the food is removed in small quantities by a spoon.

Figure 4:
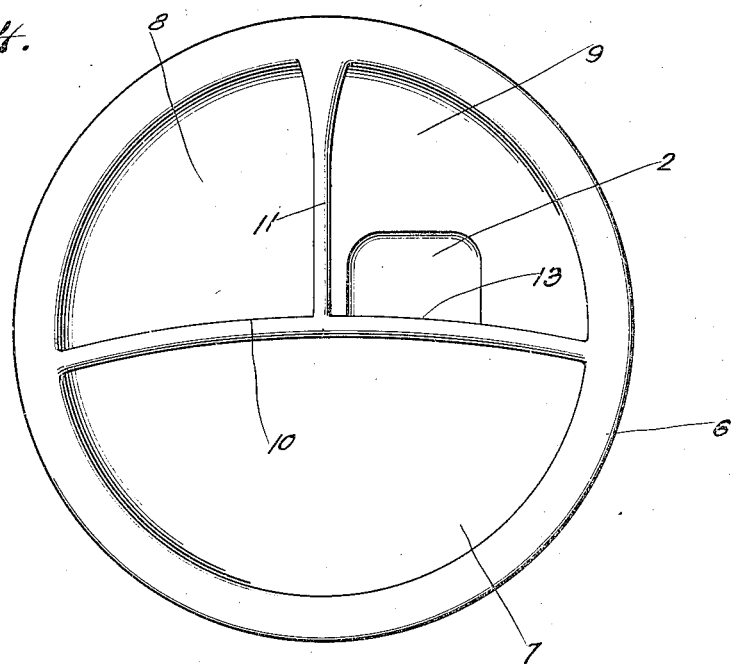
Fig. 4 is a top plan view of a different form of dish, showing what is commonly known as a three-in-one dish, with an embodiment of the invention applied thereto.

In Fig. 4 will be seen a plate 6, which is known as a three-in-one plate because it is divided into compartments 7, 8 and 9 by the walls 10 and 11. The depression 2 is provided in the dessert compartment 9 whereby the dessert or any article positioned in said compartment may be removed even though the quantity is very small. The wall is preferably caused to overhang the depression 2 at 13 so as to present the shoulder effect to the shoulder 5 illustrated particularly in Fig. 2.

Figure 5:
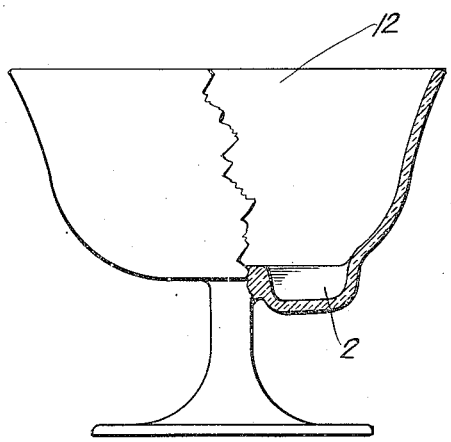
Fig. 5 is a side view of an ice-cream dish with certain parts broken away for disclosing how the invention may be applied thereto.

In Fig. 5 the invention is illustrated as being applied to an ice-cream dish 12. The depression 2 in any form of dish may be made of any size desired, but always of a sufficient length, width and depth to properly accommodate the spoon which is to be used in connection with that particular dish.

What I claim is:

1. A dish comprising a body formed as a bowl structure for receiving a liquid and other foods, said body being formed with a depression therein adjacent one of the walls thereof, said depression being in free communication with the remaining part of the dish, and means bordering the depression presenting a bead overhanging the depression.

2. A soup dish provided with a body having a bottom, side walls, and a depending supporting flange, said bottom merging into a depressed portion which in turn merges into part of said supporting flange and into part of said wall, the wall at the depressed portion having an overhanging section above said bottom.

LEONARD R. POSCHADEL.